US008535802B2

(12) United States Patent
Hayashi et al.

(10) Patent No.: US 8,535,802 B2
(45) Date of Patent: Sep. 17, 2013

(54) CONTINUOUS EMULSIFICATION METHOD AND EMULSIFICATION APPARATUS THEREFOR

(75) Inventors: Shozo Hayashi, Yokohama (JP); Hideko Hayashi, legal representative, Yokohama (JP); Yasuo Togami, Yokohama (JP); Akira Takagi, Yokohama (JP)

(73) Assignee: JX Nippon Oil & Energy Corporation (JP)

( * ) Notice: Subject to any disclaimer, the term of this patent is extended or adjusted under 35 U.S.C. 154(b) by 580 days.

(21) Appl. No.: 12/248,336

(22) Filed: Oct. 9, 2008

(65) Prior Publication Data

US 2009/0123755 A1 May 14, 2009

Related U.S. Application Data

(63) Continuation of application No. PCT/JP2007/058212, filed on Apr. 9, 2007.

(30) Foreign Application Priority Data

Apr. 10, 2006 (JP) ................................ 2006-107669
Jan. 11, 2007 (JP) ................................ 2007-003741

(51) Int. Cl.
*B32B 5/16* (2006.01)
*B01F 5/06* (2006.01)

(52) U.S. Cl.
USPC .................. 428/402.21; 366/340; 366/176.1; 428/402.2; 424/34; 424/35; 424/89; 261/78.2

(58) Field of Classification Search
USPC .................... 428/402.2; 264/4.1; 427/213.3
See application file for complete search history.

(56) References Cited

U.S. PATENT DOCUMENTS

| | | | | |
|---|---|---|---|---|
| 2,125,245 A | | 7/1938 | McCray | |
| 4,376,113 A | * | 3/1983 | Suglia et al. | 424/494 |
| 4,869,849 A | * | 9/1989 | Hirose et al. | 261/78.2 |
| 5,554,323 A | | 9/1996 | Tsukimi et al. | |
| 5,785,423 A | | 7/1998 | Chikami | |
| 6,331,317 B1 | * | 12/2001 | Lyons et al. | 424/489 |
| 6,379,035 B1 | | 4/2002 | Kubo et al. | |
| 2002/0060950 A1 | | 5/2002 | Furukawa | |

FOREIGN PATENT DOCUMENTS

| | | |
|---|---|---|
| JP | 2261525 | 10/1990 |
| JP | 5049912 | 3/1993 |
| JP | 5212270 | 8/1993 |
| JP | 9201521 | 8/1997 |
| JP | 2002028463 | 1/2002 |

* cited by examiner

*Primary Examiner* — James J Seidleck
*Assistant Examiner* — S. Camilla Pourbohloul
(74) *Attorney, Agent, or Firm* — McLane, Graf, Raulerson & Middleton, PA

(57) ABSTRACT

The present invention relates to an emulsification method and an emulsification apparatus, capable of attaining easy control of particle size and particle size distribution, and simple scale-up and maintenance, and providing an emulsifying amount sufficient for industrial production. Namely, the method comprises continuously and successively passing two or more types of liquids which are substantially immiscible with each other through two or more mesh members disposed at certain intervals in the presence of an emulsifier to thereby perform emulsification, and the emulsification apparatus as an apparatus for carrying out the method comprises liquid feed pumps for feeding two or more types of liquids which are substantially immiscible with each other, and a cylindrical flow passage to which the two or more types of liquids are fed by the liquid feed pumps, the cylindrical flow passage including a predetermined number of wire gauzes disposed therein at a predetermined interval.

12 Claims, 4 Drawing Sheets

CONTINUOUS EMULSIFICATION METHOD AND EMULSIFICATION APPARATUS THEREFOR

This application claims priority to International Application No. PCT/JP2007/058212, with an international filing date of Apr. 9, 2007, which claims priority from Japanese Patent Application No. 2006-107669 filed on Apr. 10, 2006, and Japanese Patent Application No. 2007-003741 filed on Jan. 11, 2007.

FIELD OF THE INVENTION

The present invention relates to an emulsification method and an emulsification apparatus for continuously and stably producing an emulsion having a uniform particle size of the dispersion phase and in a large amount. The present invention further relates to microcapsules and polymer fine particles using an emulsion produced using the method and apparatus.

BACKGROUND OF THE INVENTION

An emulsion includes a liquid phase substance immiscible with a continuous liquid phase, which is dispersed in the continuous liquid phase. Emulsions, such as an O/W emulsion, in which oil droplets are dispersed in a continuous aqueous phase, and a W/O emulsion, in which aqueous droplets are dispersed in a continuous oil phase, are generally known. Further, it is known that such emulsions can be produced by an interface chemical method using an emulsifier or by a mechanical method using a specific emulsification apparatus. These two methods are generally used in combination to produce a stable emulsion. However, in the latter mechanical method, it is generally known that properties (e.g., droplet diameter of the dispersion phase and droplet diameter distribution thereof) of a resulting emulsion are largely varied depending on the emulsification apparatus used.

Currently, emulsions occupy important positions as raw materials and products in various industrial fields, for example, in the fields of cosmetics, food, paint, paper manufacture, film, recording material and the like. As the properties of such emulsions, the particle size and particle size distribution of the droplets that form the dispersion phase are important factors which seriously affect the stability of the emulsion or properties of a final product. Particularly, in a cosmetic emulsion or the like, the compatibility to the skin varies depending on the average particle size and particle size distribution of the emulsified and dispersed droplets. Further, the product stability thereof is also seriously affected thereby.

A microcapsule having a polymeric membrane or the like formed at an interface between the continuous phase and the dispersion phase of an emulsion, or a polymer fine particle obtained by polymerizing an emulsion liquid comprised of a polymeric dispersion phase is produced by treating the emulsion through processes such as polymerization, filtration and washing, drying, sieving, and breaking up of aggregate. Such microcapsules or polymer fine particles are also used in various industrial fields. The microcapsules are used as information recording material using pressure sensitivity, heat sensitivity and photosensitivity as their characteristics, including toner for copying machines and printers, as display material such as electronic paper, and further as medicine, pesticide, insecticide, fragrance, thermal storage medium and the like. The polymer fine particles are used as an antiblocking agent for plastic film, as an optical material for providing light diffusion/reflection preventing functions or for spacer use, as paint and ink for providing functions such as frosting, coloring and tactile sensation to building materials or automotive interiors, as cosmetic material for providing a slipping property to foundation or the like, as resin additive for improving heat resistance, solvent resistance or low shrinkage property, and further as a diagnostic testing agent and particulate formulation in medical field. The microcapsules and polymer fine particles are used, in addition, for various purposes such as pigment, dyestuff, conductive member, thermosensitive recording paper, resin reinforcement, grease additive, artificial stone, chromatography and the like. Since the particle size and particle size distribution of generated particles are substantially determined in these microcapsules and polymer fine particles during the stage of emulsification, it is not an exaggeration to say that the properties of an emulsion determine the final performances of a product. Therefore, development of an emulsification apparatus, capable of easily producing a product having desired average particle size and particle distribution, particularly, a narrow particle size distribution, is needed regardless of whether or not the product is used in a form of emulsion or in a form of microcapsule or polymer fine particle.

Various methods are proposed for the mechanical production of emulsions. The most common emulsification method comprises feeding raw materials into a batch tank and agitating the contents in the tank by a shearing blade rotating at high speed. However, this method can be problematic due to the formation of non-uniform particle size of the discontinuous phase (i.e., the dispersion phase) in a final emulsion or residue of unemulsified raw materials due to the tendency of non-flowing parts to remain within the tank, or difficulty in scale-up. An apparatus having an agitating device that is separate and distinct from the shearing blade, can be adapted to cause the entire contents in the tank flow can be a countermeasure to prevent such problems, is also proposed, it is extremely difficult to perfectly solve the problems. Further, an increased cost is needed for scale-up since the shearing blade and a drive unit thereof must be enlarged therefor. This method is disadvantageous also from the point of maintenance since the drive part, which rotates at high speed, has a precision structure. Further, when the emulsifying amount is large, denaturation of the contents may be caused during the emulsifying operation since the emulsifying operation takes a long time.

In order to solve the above-mentioned problems, a method for continuously performing emulsification is also proposed.

Japanese Patent Application Laid-Open No. H5 (1993)-49912 for example, discloses continuous emulsification that is carried out by rotating an agitating blade having a specific tip shape at high speed in a narrow area within a pipe and introducing raw materials into the narrow area between an outer wall and the tip of the agitating blade. In this method, since the shearing force is determined based on the rotation of the blade, an extremely large power output part is needed when a large shearing force is required, or when an emulsion having small dispersion phase droplets is to be obtained. In addition, a problem occurs such that when the emulsifying amount is increased, an emulsion liquid having a dispersion phase with a uniform particle size distribution cannot be obtained since the residence time in the emulsification apparatus is shortened. Further, the agitating blade is difficult to fabricate and maintain due to the complicated shape of its tip and a very narrow clearance between the tip and the outer wall.

Japanese Patent Application Laid-Open No. H6 (1994)-142492 discloses an emulsification apparatus that includes a preliminary mixing tank of raw materials is needed, and wherein emulsification is performed by passing the raw material mixture through a subsequent emulsion machine (in line)

in which the shearing force is continuously changed. According to this method, an emulsion having a wide particle size distribution can be obtained, the emulsion being characteristically free from extremely large particles or extremely small particles. In this method, however, since the raw material loading amount and the number of rotations of the emulsifying machine must be controlled, the operation becomes complicated. Further, if a material to be emulsified is reactive, clogging may result.

Japanese Patent Application Laid-Open No. H9 (1997)-029091 discloses that emulsification is carried out by continuously feeding raw materials from the bottom of a kiln, agitating the content in the kiln, and continuously extracting from an upper portion of the kiln an amount of the content which is equivalent to the amount to be loaded. With this method, clogging is never caused within the emulsification apparatus even if the raw material to be emulsified is a reactive compound. However, when the emulsification rate is raised, deterioration of the particle size distribution of the dispersion phase and short-pass discharge of unemulsified raw materials can result in the worst case.

Japanese Patent Application Laid-Open No. H5 (1993)-212270 discloses a continuous emulsification method using a porous glass pipe. In this method, an expensive apparatus is needed, and clogging of the porous glass pipe may result if the raw material is reactive. The particle size of the emulsion is determined by the pressure at the time of pushing raw materials to be emulsified out of the porous glass pipe and the flowing state of a fluid which can form a continuous phase. Therefore, controlling the particle size becomes complicated and difficult. Further, since the porous glass pipe is expensive, a problem may be caused such that an increased cost is needed for scale-up.

Further, Japanese Patent Application Laid-Open No. H2 (1990)-261525 and Japanese Patent Application Laid-Open No. H9 (1997)-201521 disclose methods for instantaneous emulsification by making raw materials to be emulsified collide with each other at super-high pressure and high speed. Such an apparatus requires an apparatus body having a robust structure due to serious wear that results from extremely high operating pressure. Further, the emulsifying effect is difficult to control since its emulsification is based on the impact force of the collision of the raw materials to be emulsified. As a result, particle size distribution of dispersion phase droplets in the emulsion liquid becomes remarkably nonuniform.

Japanese Patent Application Laid-Open No. 2000-254469 and Japanese Patent Application Laid-Open No. 2002-28463 disclose emulsification apparatuses having a structure in which two or more sheet-like elements divided into a number of polygons by barrier walls or sheet-like elements having a number of pore parts are directly superposed. With these apparatuses, mixing or emulsification of raw materials to be emulsified is carried out by passing the raw materials through divided flow passages formed by the two or more sheet-like elements. However, this method requires a strict adjustment for layout of each element within the apparatus, in addition to the complicated shape of the elements used. Further, with emulsification apparatuses utilizing the division method, the division effect is reduced when the particle size of dispersion phase droplets in the emulsion liquid becomes smaller, and the emulsifying effect of the apparatus itself is consequently reduced.

Finally, Japanese Patent Application Laid-Open No. 2002-159832 discloses an emulsification apparatus having a structure composed of two or more spaces partitioned by barrier walls having one or more small pores. The disclosed apparatus is adapted to emulsify the raw materials to be emulsified by pulverizing and fragmenting the raw materials using a strong impact force when introducing the raw materials into an adjacent space at high speed and high pressure through the small pores. However, the particle size distribution of the emulsion liquid obtainable in principle tends to be nonuniform since the fragmentation phenomenon by impact is difficult to control. Namely, only the fragmentation phenomenon by impact is used as the principle of emulsification. Further, the emulsification apparatus needs a robust structure for introducing the raw materials under high pressure.

As described above, the conventionally proposed continuous emulsification methods and apparatuses had problems such as poor uniformity of dispersion phase droplets in a resulting emulsion liquid, difficulty in scale-up, complexity of apparatus and complication of maintenance, thus were not sufficiently satisfactory.

DISCLOSURE OF THE INVENTION

To solve the problems associated with the conventional continuous emulsification methods and apparatuses, the present invention provides a continuous emulsification method and apparatus for providing an emulsion containing droplets having a desired average particle size and a desired particle size distribution, particularly, a narrow (i.e., uniform) particle size distribution, suitable for various uses described above, which can attain easy control, simple scale-up and maintenance with a simplified structure, and, further, an emulsifying material throughput sufficiently capable of industrial production. The present invention also aims to provide various industrial products such as microcapsules and polymer fine particles having a desired average particle size and a desired particle size distribution, particularly, a narrow (i.e., uniform) particle size distribution, which are suitably used for various purposes described above, by using an emulsion liquid obtained by the method and apparatus.

According to a first aspect of the invention, an emulsification method includes continuously and successively passing two or more liquids that are substantially immiscible with each other through two or more mesh members disposed at certain intervals within a flow passage in the presence of an emulsifier.

According to a second aspect of the invention, an emulsification apparatus includes liquid feed pumps for feeding two or more liquids that are substantially immiscible with each other, and a cylindrical flow passage, one end of which the two or more liquids are introduced using liquid feed pumps, and carried toward the other end thereof. The cylindrical flow passage includes two or more mesh members disposed therein at certain intervals, so that emulsification is performed by successively passing the liquids through the two or more mesh members.

The mesh members are composed of, for example, wire gauze.

Further, the present invention relates to a microcapsule or polymer fine particle produced using an emulsion liquid obtained by the above-mentioned method and apparatus.

EFFECT OF THE INVENTION

According to the present invention, an emulsion liquid having a desired average particle size and a desired particle size distribution can be continuously obtained in large amount by controlling the dispersion phase droplets using an emulsification apparatus that includes two or more mesh members, e.g., wire gauze, that are disposed a fluid flow passage. According to the present invention, a uniform emulsion, particularly. An emulsion having a particle size distribution of droplets narrower than that previously obtained. This apparatus is easy to disassemble due to the simple structure and thus easily maintained. Microcapsules and polymer particles having a desired particle size and a particle size distribution can be obtained by using an emulsion liquid obtained by this emulsification apparatus. According to the present invention, uniform microcapsules and polymer particles, particularly, uniform microcapsules and polymer particles having a particle size distribution containing droplets narrower than previously obtained. An emulsion liquid obtained by the emulsification method of the present invention can be suitably used as raw materials and products in various industrial fields, for example, in the fields of cosmetics, food, paint, paper manufacture, film, recording material and the like. In its application to cosmetics, excellent compatibility to the skin and excellent product stability can be ensured.

Microcapsules obtained from the emulsion liquid are suitably used as information recording material having pressure sensitivity, heat sensitivity and photosensitivity, e.g., toner for copying machines and printers, as display material, e.g., electronic paper, and further as medicine, pesticide, insecticide, fragrance, thermal storage medium and the like. Polymer fine particles obtained from the emulsion liquid are suitably used as an antiblocking agent for plastic film, as an optical material for providing light diffusion/reflection for preventing functions or for spacer use, as paint and ink for providing functions such as frosting, coloring and tactile sensation to building materials or automotive interiors, as a cosmetic material for providing slipping property to foundation or the like, as a resin additive for improving heat resistance, solvent resistance, and/or low shrinkage properties, and further as a diagnostic test agent and particulate formulation in medical field. The microcapsules and polymer fine particles are used, in addition, for various purposes such as pigment, dyestuff, conductive members, thermosensitive recording paper, resin reinforcement, grease additives, artificial stone, chromatography and the like. Since the microcapsules and polymer fine particles include products having a desired average particle size and a desired particle size distribution, particularly, a narrow (i.e., uniform) particle size distribution, they exhibit performances better than conventional products when used for these purposes.

BEST MODE FOR CARRYING OUT THE INVENTION

Figure 1:
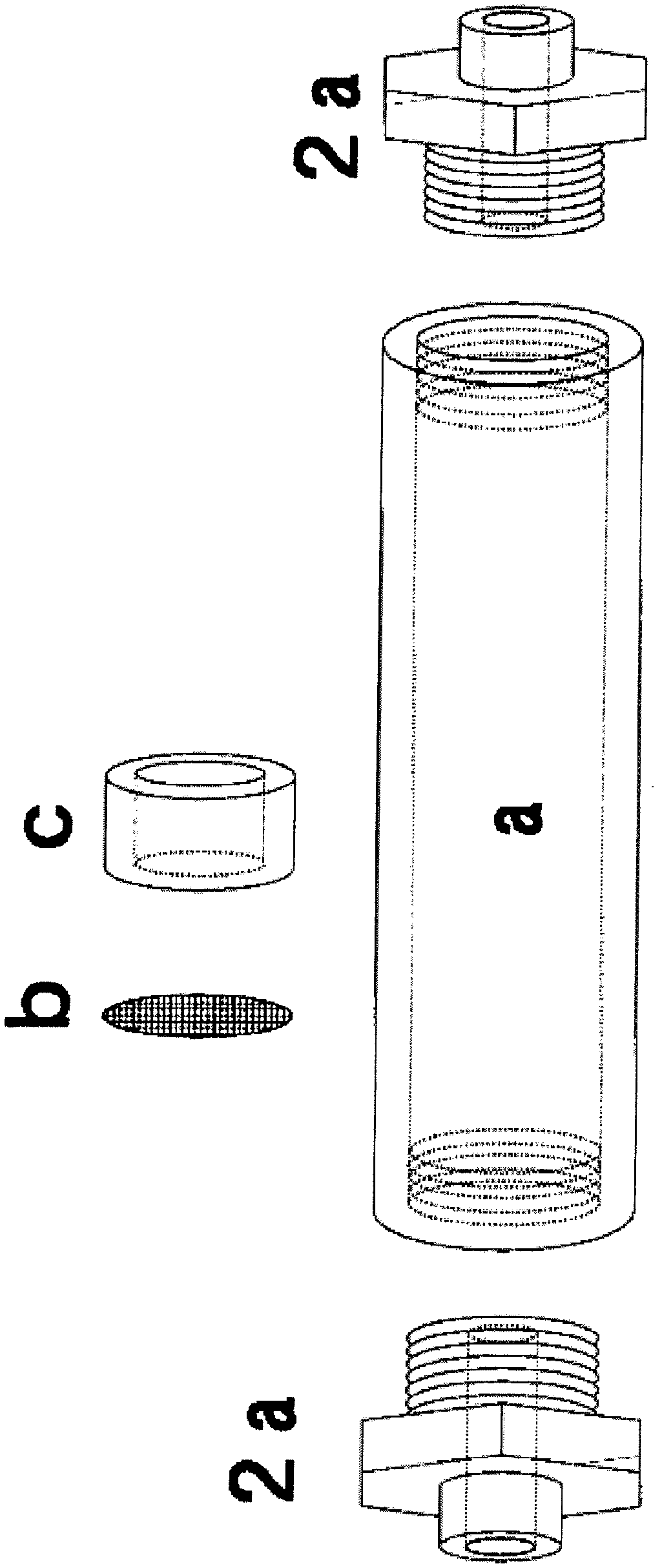
FIG. 1 is a perspective view of one embodiment of configuration in a continuous emulsification apparatus of the present invention.

In the emulsification method of the present invention, emulsification is performed by feeding two or more liquids that are substantially immiscible with each other into a flow passage and successively passing the fed liquids through mesh members disposed at two or more positions within the flow passage.

The two or more fluids are raw materials to be emulsified t do not have to be preliminarily mixed. Each raw material to be emulsified may be fed separately by use of an appropriate feed pump (e.g., a liquid feed pump). For example, in the case of an emulsion liquid of an O/W type or the like, oil and water can be fed into the flow passage using independent feed pumps. Of course, the oil and water can be mixed in advance appropriately. Mixing during introduction into the emulsification apparatus is not particularly limited, and a device for mixing, e.g., an agitator, is not needed. In general, the introduction is preferably performed with a mixing degree of in-line blending. Of course, the liquids can be preliminarily mixed. It is preferred to introduce the raw materials to be emulsified into the mesh member in a preliminarily mixed state so that each raw material to be emulsified reaches the mesh member to form an absolutely separate flow. Indeed, emulsification by fluid division is difficult to be carried out in a completely non-mixed state. This level can be sufficiently attained by the in-line blending as described above.

To the raw materials to be emulsified, an emulsifier or dispersant can be appropriately mixed in advance. If needed, such agent can be introduced independently and directly into the emulsifying machine. The type and addition amount thereof may be appropriately determined.

The flow velocity of the fluid flowing in the flow passage of the emulsification apparatus does not have to be so high as to bring about collision or breakage in view of the emulsifying mechanism of the present invention described below. Of course, since an excessively low velocity increases the probability of reaggregation of divided small drops, an appropriate flow velocity is maintained. The feed velocity into the flow passage is generally carried out at a linear velocity of about 0.1 to 50 cm/sec for the raw materials to be emulsified and for the emulsion liquid. In the present invention, two or more mesh members having a large opening area, e.g., wire gauze, but the pressure loss of the fluid system thereby can be reduced nevertheless, since the mesh members are disposed at a predetermined interval. Therefore, the linear velocity of the fluid can be relatively increased, and the material throughput in the present invention can be consequently increased.

The mesh members are disposed at a predetermined interval in two or more positions within the flow passage, and the supplied raw materials to be emulsified are successively passed through the two or more mesh members, during which emulsification is progressed and completed. Although the emulsification mechanism and the action and effect or the like of the mesh members by this method are still uncertain, it would appear that, upon reaching the mesh member, the fluid is divided into small droplets by a number of small pores of the mesh member. The generated small droplets are stabilized while the fluid reaches the next mesh member, and the particle size of the dispersion phase droplets is consequently uniform. If the time for bringing fluid to the next mesh member is long, the generated small droplets may coagulate. Therefore, it is important to determine the interval to an appropriate distance which is neither too short nor too long.

Because the fluid is brought to the mesh member for the purpose of fluid division by the small pores of the mesh member and not for the purpose of pulverization of droplets by collision or the like, the speed and velocity of the fluid do not have to be increased. A high-speed or high-pressure fluid may be rather undesirably destabilized because the time for stabilization of the fluid in the interval between two or more mesh members is shortened, or because the fluid is excessively divided or enhances collision or pulverization.

To be specific, the interval between the mesh members, which is varied depending on the fluid flow velocity, fluid viscosity or the like in the flow passage, is set preferably to 5 to 200 mm in general, and more preferably to 10 to 100 mm. It is preferred to adapt a longer interval at a higher flow velocity and conversely a shorter interval at a higher fluid viscosity.

It is important to dispose the mesh members in two or more positions along the flow passage, and the number of arrangement positions is set preferably to 5 to 50 locations, more preferably to 10 to 50 locations, and most preferably to 20 to 40 locations. The fed raw materials to be emulsified are successively and continuously passed through the mesh members disposed in the two or more positions from the inlet of the flow passage toward the outlet thereof.

As a mesh member, wire gauze, e.g., a metallic mesh member, can be conveniently adopted, because the opening rate of the small pores, density of the small pores or the like can be selectively varied according to the mesh size while ensuring a certain mechanical strength. Any mesh members made of other materials which correspond to the wire gauze can also be appropriately adopted.

The wire gauze preferably has mesh number of 35 to 4000, and more preferably 150 to 3000 as specified in ASTM Standard as described later. The wire gauze can appropriately have a multilayer lapped structure for reinforcement or the like. An excessively thick mesh member is not preferred. Therefore, the wire gauze, even if it is the multilayer lapped body, is preferably adapted to be appropriately supported by a spacer described below or the like, to ensure the mechanical strength while generally having a thickness of several mm or less. A wire gauze thickness used for a filter or the like generally suffices.

To adjust the fluid viscosity, the flow passage for the emulsification can be appropriately cooled or heated; although the temperature, pressure and the like in the flow passage are not particularly limited. Alternatively or in addition, the fluid pressure can also be properly changed to adjust the flow velocity of the fluid. Namely, a pressure such that it provides an appropriate flow velocity suffices, and no particularly high pressure is needed.

The apparatus by the method of the present invention will be described herein below in detail in reference to the accompanying drawings.

FIG. 1 is a perspective view of one embodiment of configuration of a continuous emulsification apparatus of the present invention.

Figure 2:
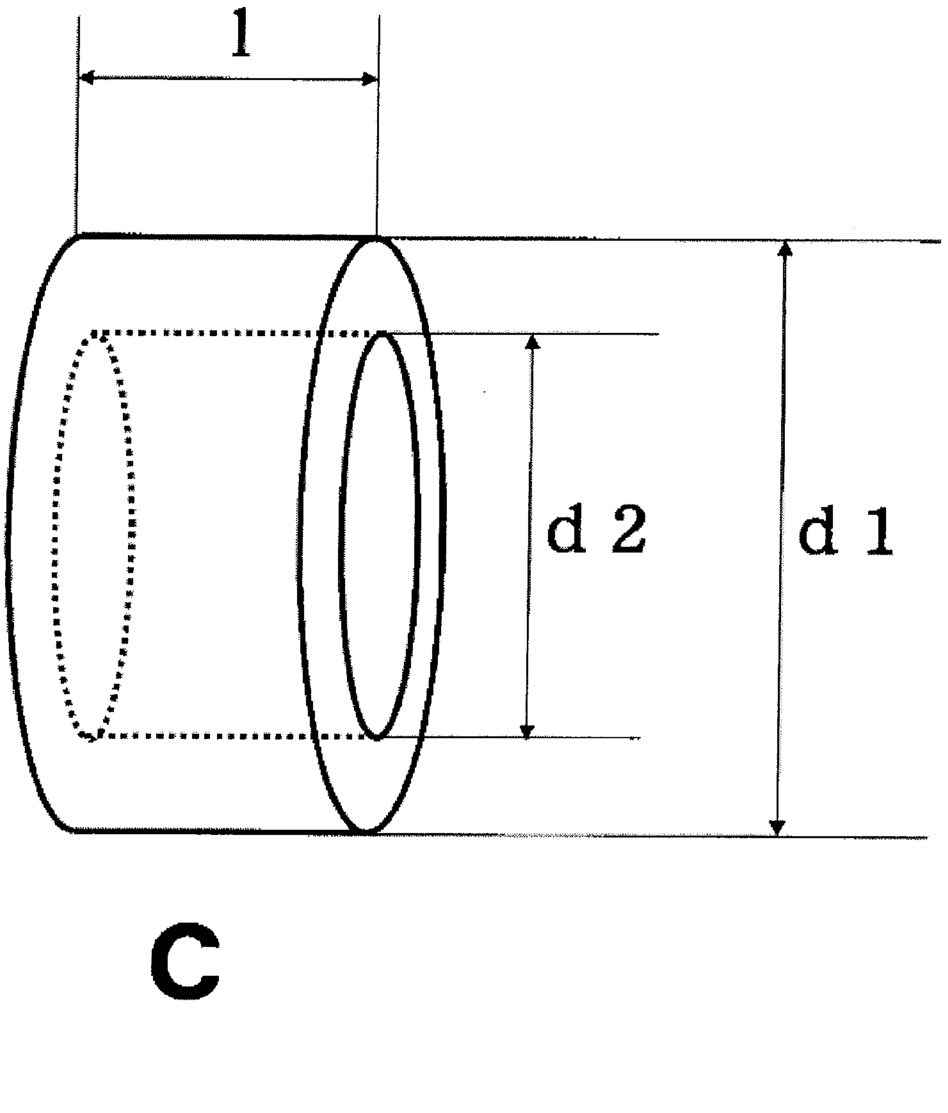
FIG. 2 is a perspective view of a spacer c used in the present invention.

FIG. 2 is a perspective view of a spacer c used in the present invention.

Figure 3:
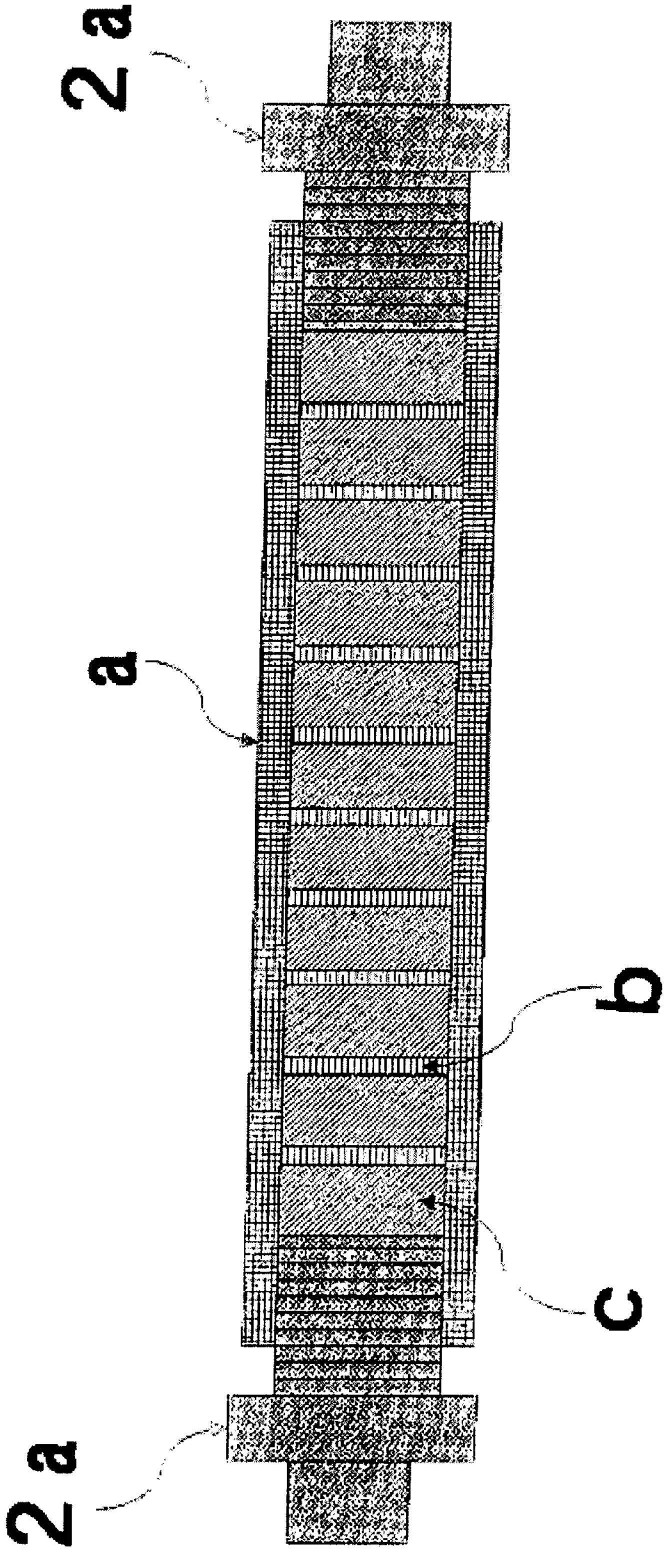
FIG. 3 is a cross-sectional view of an emulsification apparatus composed of 10 units as one embodiment of the present invention.

FIG. 3 is a cross-sectional view of an emulsification apparatus composed of 10 units as one embodiment of the present invention.

Figure 4:
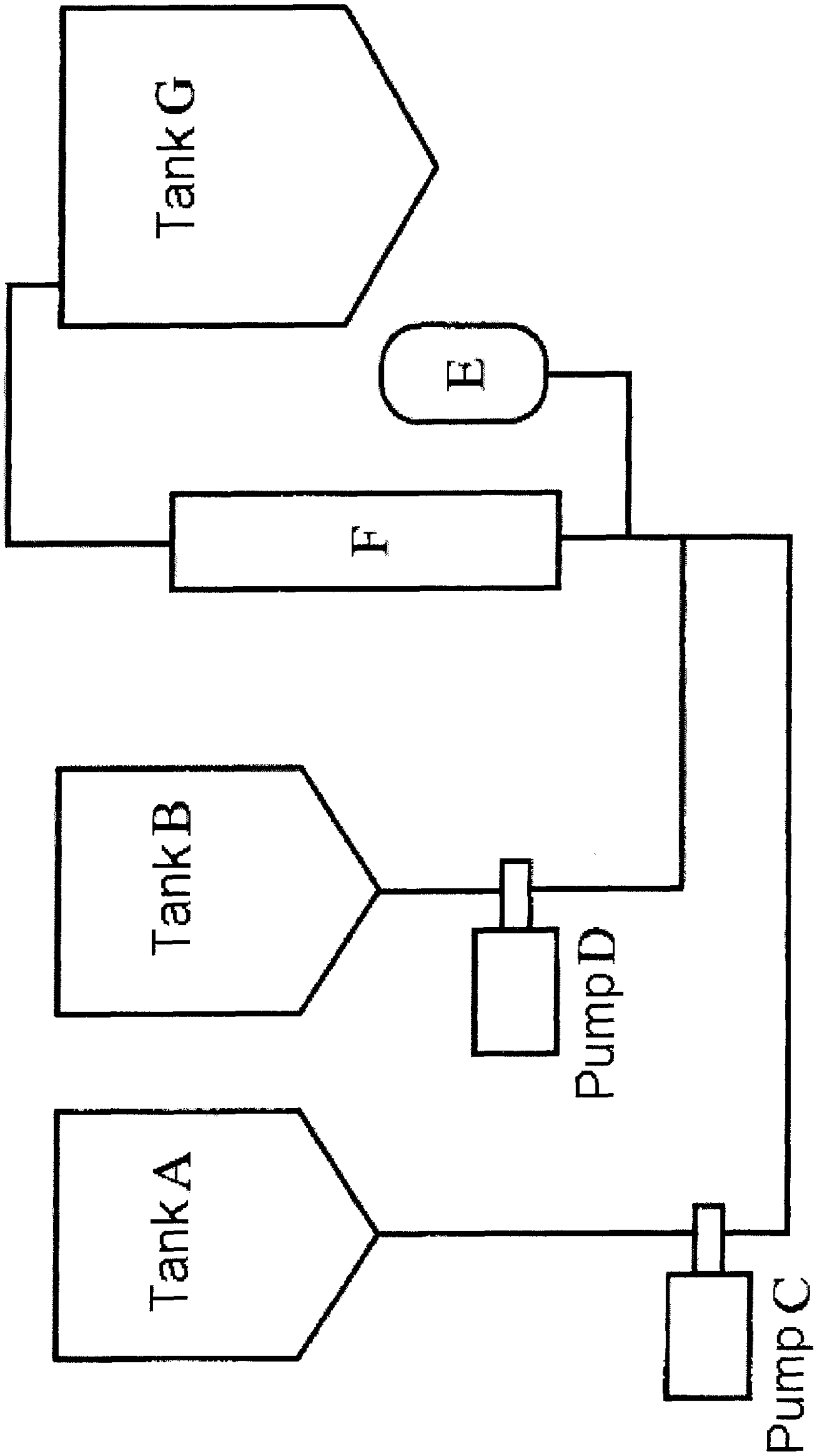
FIG. 4 is a flow chart including raw-material-to-be-emulsified tanks, plunger pumps, an emulsification apparatus F and a product tank, wherein denoted at a is a casing, b is a wire gauze, c is a spacer, and 2*a* is a stopper.

FIG. 4 is a flow chart including raw-material-to-be-emulsified tanks, plunger pumps, an emulsification apparatus F and a product tank.

The emulsification apparatus shown in FIG. 1 includes a cylindrical casing a, and a stopper 2*a* for fixing a unit including a pair of wire gauzes b and the spacer c within the casing.

The spacer c is adapted to retain the two or more wire gauzes b with a predetermined interval between the both.

The length of the casing a is determined depending on the length of the unit composed of the wire gauzes b and the spacer c and depending on the number of units to be fixed within the casing a. The pressure resisting performance of the casing a is determined depending on the loading amount (i.e., the loading pressure) of the raw materials to be emulsified flowing inside thereof, and appropriately designed to fix the units. The sectional shape of the casing to which the units are inserted is preferably a cylindrical shape as shown in FIG. 1 from the viewpoint of workability, pressure resistance, or prevention of residence of the liquid passed through the inside, although it is not particularly limited thereto. The casing a, the wire gauze b, the spacer c and the stopper 2*a* can be manufactured of any material which is not corroded by the raw materials to be emulsified and that has a strength such that it can endure a pressure generated during emulsifying operation.

The wire gauze b has substantially the same shape and size as the internal cross section of the cylindrical casing a in the case of FIG. 1. According to this, the wire gauze b can be fixed within the cylindrical casing a without distortion, and the raw materials to be emulsified can be surely passed through the flow passage constituted by the two or more units. When the wire gauze b is lapped over the spacer c to constitute the unit, the contact faces of both must be closely fitted. According to this, the raw materials to be emulsified can be passed through only the flow passage formed by the wire gauze b and the spacer c to thereby surely perform the emulsification.

As the wire gauze b, a mesh material having a mesh number of 35 to 4000 as specified in ASTM Standard can be used. The mesh number to be applied can be properly selected depending on the raw materials to be emulsified and an intended dispersion phase droplet diameter. A mesh number smaller than 35 is undesirable because the emulsifying effect is remarkably deteriorated. A mesh number of 4000 or more is also undesirable because the operating pressure in the emulsifying operation becomes too high for emulsification. A wire gauze having 150 mesh to 3000 mesh is a preferred example. Although the shape of the wire gauze is not particularly limited, plain-woven, twilled, plain mat woven, twilled mat woven or semi-twilled wire gauze can be preferably used.

In the present invention, the wire gauze can have a multilayer structure in which two or more layers are lapped for the purpose of surface protection, retention of strength, and dispersion control. The wire gauze for emulsification in the multilayer structure will be hereinafter referred to as main wire gauze. Punching metal, wire gauze or the like is preferably used as the material. The shape of the material to be lapped over the main wire gauze is not particularly limited as long as it can attain the surface protection, retention of strength and dispersion control of the main wire gauze. When wire gauze (hereinafter referred to as sub-wire gauze) is used for that purpose, it is necessary for the sub-wire gauze to have a mesh number (ASTM Standard) equal to or less than the mesh number of the main wire gauze. In the emulsification apparatus of the present invention, the properties of the resulting emulsion liquid are determined by the wire gauze (main wire gauze) having a maximum mesh number set within the flow passage of the emulsification apparatus. Therefore, it is not preferred to set the mesh number of the sub-wire gauze larger than the mesh number of the main wire gauze. When the main wire gauze includes two or more lapped layers, it is preferred to fix the respective layers, e.g., by sintering, to prevent deformation of the main wire gauze within the flow passage or the like.

The spacer c is shown in FIG. 2. In the emulsification apparatus of the present invention, it is essential to isolate the wire gauzes, and for this purpose, the spacer c, for example, is used.

The spacer c has the effect of stabilizing the emulsion liquid obtained through the wire gauze in addition to the effect of fixing the wire gauze within the cylindrical flow passage and, as a result, the particle size of the dispersion phase droplets is made uniformed.

The length l of the spacer c is not particularly limited, but set preferably to 5 to 200 mm, more preferably to 7 to 100 mm, and most preferably to 10 to 100 mm. When the length l of the spacer c is smaller than 5 mm, the particle size of the dispersion phase droplets in the emulsion liquid undesirably becomes nonuniform. When the length l of the spacer c is larger than 200 mm, coalescence of the dispersion phase droplets of the emulsion liquid at the spacer c part, or formation of a dead space is undesirably caused due to the resulting excessively extended length of the emulsification apparatus body. The outer diameter d1 of the spacer c is preferably close to the inside diameter of the casing within the insertable range thereof to the cylindrical casing a. According to this, the wire gauze can be perfectly fixed within the flow passage, and the raw materials to be emulsified can be surely guided to the flow passage formed by the spacer c and the wire gauze b. The inside diameter d2 of the spacer is preferably set within the range of (d1−d2)/d1=0.01 to 0.5 relative to the spacer outer diameter d1, and more preferably within the range of 0.1 to 0.3. A value of 0.01 or less is undesirable because the fixing of the wire gauze is insufficient. When the value is larger than 0.5, the flow passage is remarkably narrow, and the emulsification efficiency is undesirably deteriorated.

The emulsification apparatus of the present invention is used by inserting two or more units each composed of a pair of wire gauzes b and the spacer c within the cylindrical casing a. The number of units to be inserted is not particularly limited as long as it is two or more, but is preferably 5 to 50. When the number of units is less than 5, the particle size distribution of the dispersion phase droplets in the resulting emulsion liquid undesirably becomes nonuniform. When the number of units exceeds 50, the pressure during emulsifying operation is remarkably increased, which is undesirable. The number of units is more preferably 10 to 50, and most preferably 20 to 40.

In FIG. 3, an emulsification apparatus having ten (10) units is shown. Each of the ten (10) units includes wire gauze and a spacer. An additional spacer is further inserted into the casing to prevent damage of the wire gauze surface through contact between the wire gauze b and the stopper 2*a*. In this embodiment, the units within the casing are fixed by screwing the stopper 2*a* onto the casing. However, any stopper having the same function can be adapted without limitation for the form thereof. For example, stoppers of clamp type, flange type and the like can be used.

In the emulsification apparatus of the present invention, the temperature during emulsification can be adjusted as needed by heating or cooling the cylindrical casing from the outside. The temperature of the casing can be adjusted, for example, by means of attachment of a band-like or ribbon-like heater to the exterior of the casing, application of an open or sealed tubular electric furnace, or attachment of a heating/cooling jacket to the exterior of the casing.

The procedure for introducing raw materials into the emulsification apparatus of the present invention and for performing emulsification is concretely described in reference to FIG. 4. In FIG. 4, tanks A and B contain raw material to be emulsified. For example, a hydrophobic liquid, e.g., hydrocarbon liquid, is stored in the tank A, and water is stored in the other tank B.

A dispersant (emulsifier) is charged in either of the raw material tanks. In this example, it is stored as an aqueous solution in the tank B.

The amount and type of the dispersant to be used are not particularly limited. For example, a dispersant or emulsifier such as anionic, cationic, nonionic or amphoteric surfactant can be used. For the illustrative example, PVA (polyvinylalcohol) can be used as the dispersant for emulsifying the hydrocarbon liquid in the water, and an aqueous solution of about 1% by mass can be used.

An agitating device, a heating device or the like can be appropriately added to the tanks A and B for the purpose of preparing the raw materials to be emulsified. Pumps C and D are flow rate adjustable plunger pumps for introducing the raw materials to be emulsified in tanks A and B, respectively, at optional ratios to the emulsification apparatus. The liquid feed amount is generally set to about 6 to 3000 ml/cm$^2$/min although it is not particularly limited thereto.

The raw material to be emulsified from each pump is fed and in line blended in an inlet side line of the emulsification apparatus F; and a resulting mixture liquid is introduced into the emulsification apparatus F.

An accumulator E for suppressing pulsation of the fluid can be set on the pump side of the raw material to be emulsified inlet of the emulsification apparatus F. Any pump capable of stably supplying an intended flow rate can be used to introduce the raw materials to the emulsification apparatus F without limitation for the form thereof. For example, the above-mentioned plunger pump can be used.

After completion of emulsification in the emulsification apparatus F, the resulting product is received in a tank G. The tank G is a receiving tank of the emulsion liquid as the product.

An agitation device, a heating device or the like can be added also to the product tank G for the purpose of causing a reaction using the emulsion liquid, for example, capsulation, polymerization or the like.

At the time of the emulsification operation, the raw materials are introduced from the tanks A and B into the emulsification apparatus F by the pumps C and D at optional ratios and flow rates, respectively, and the resulting emulsion liquid is guided to the receiving product tank G.

According to the present invention, hydrocarbon liquid and a monomer such as acrylic monomer (e.g. methyl methacrylate (MMA)) or styrene monomer can be emulsified into an appropriate medium, for example, water.

The emulsion can have particles generally having a particle size ranging from 0.1 to 200 μm, although the particle size is not particularly limited, with a narrow particle size distribution of 35% or less as CV value (%) described below.

Further, the capsulation of droplets can be easily performed by adding a capsule membrane forming monomer such as methylol melamine to the resulting emulsion to polymerize the droplets at the particle interfaces by an ordinary method. The particle state and dispersion state of the resulting capsules correspond to those of the emulsion.

Similarly, polymer particles having a particle state and a dispersion state corresponding to the particle (emulsion) state and the dispersion state of an original emulsion can be obtained by preparing an aqueous emulsion of a monomer according to the present invention, such as methyl methacrylate (MMA) monomer or styrene monomer containing an initiator by an ordinary method, and heating it to polymerize the droplets.

According to the present invention, by using an emulsification apparatus having an extremely simple structure in which two or more mesh members, e.g., wire gauze, are only set in a flow passage of fluid, an emulsion liquid with uniform dispersion phase droplet diameter can be continuously produced in large quantities. Further, due to the simple structure, this apparatus is easy to disassemble and easy to maintain. By using an emulsion liquid obtained by this emulsification apparatus, microcapsules and polymer particles with uniform particle sizes can be produced.

The present invention will be further concretely described herein below according to examples.

EXAMPLE 1

An emulsification apparatus was constituted by inserting ten (10) units, each unit including wire gauze having a 1400-mesh main wire gauze, a spacer having a length of 10 mm, and an inside diameter of 15 mm, into a cylindrical casing having an inside diameter of 20 mm. The length of the casing is about 120 mm.

As raw materials to be emulsified, a hydrocarbon-based solvent "Nisseki Naphtesol (Grade 200)" (Density: 813 kg/m$^3$ (15° C.), Distillation boiling point range: 201-217° C., manufactured by Nippon Oil Corporation) mainly composed of a naphthene (cycloparaffin)-based hydrocarbon mixture and a dispersant aqueous solution (1% by mass PVA 205, by Kuraray Co., Ltd.) were used. The emulsifying operation was carried out by introducing the raw materials into the emulsification apparatus respectively at flow rates of 100 ml/min and 200 ml/min by independent plunger pumps, whereby an O/W emulsion liquid was obtained. The volume average diameter of dispersion phase droplets (hereinafter referred to as "volume average particle size") and the droplet diameter distribution of the emulsion liquid were measured using a Coulter Multisizer II counter (manufactured by Beckman Coulter Inc.). The number of particles measured was 100,000. As a result, the volume average particle size of droplets was 20 μm, and CV value was 30%.

The CV value used as an index of droplet diameter distribution was calculated according to the following equation.

*CV* value Standard deviation of droplet diameter distribution/volume average particle size×100

In the following examples and comparative examples, the volume average particle size and CV value were measured by the same method.

EXAMPLE 2

An emulsion liquid was prepared by the same operation as in Example 1, except that the number of units to be inserted to the casing was 40. The volume average particle size of dispersion phase was 18 μm, and the CV value was 24%.

EXAMPLE 3

An emulsion liquid was prepared by the same operation as in Example 1, except that 250-mesh wire gauze was used as the main wire gauze. The volume average particle size of dispersion phase was 55 μm, and the CV value was 25%.

EXAMPLE 4

An emulsion liquid was prepared by the same operation as in Example 1, except that 2400-mesh wire gauze was used as the main wire gauze. The volume average particle size of dispersion phase was 10 μm, and the CV value was 24%.

EXAMPLE 5

An emulsion liquid was prepared by the same operation as in Example 1, except that the raw materials to be emulsified were changed to a hydrocarbon-based solvent "Nisseki Hisol SAS (Grade 296)" (Density: 987 kg/m$^3$ (15° C.), Distillation boiling point range: 290-305° C., manufactured by Nippon Oil Corporation) mainly composed of an aromatic hydrocarbon mixture having a diaryl alkane structure in which 5% by mass of crystal violet lactone was dissolved, and a dispersant aqueous solution (5 wt % Micron 8020, manufactured by Nissho Kogyo Co., Ltd.). Methylol Melamine M3 (manufactured by Sumika Chemtex Co., Ltd.) was added to the resulting emulsion liquid so that the solid content concentration of Methylol Melamine to SAS 296 was 20% by mass. Capsulation was performed through heating and agitation at 60° C. for three (3) hours. The volume average particle size of the capsules was 10 μm, and the CV value was 28%. The resulting capsule slurry was diluted four (4) times with water, and the diluted solution was applied to commercially available CF paper. As a result, no coloring was observed, and completion of capsulation was confirmed.

EXAMPLE 6

An emulsion liquid was prepared by the same operation as in Example 1, except that the raw materials to be emulsified were changed to methyl methacrylate (MMA) in which 1% by mass of benzoyl peroxide was dissolved and a dispersant aqueous solution (1% by mass PVA 205, manufactured by Kuraray Co., Ltd.). The resulting emulsion was heated and agitated at 60° C. for eight (8) hours in nitrogen atmosphere to thereby remove water, and solid MMA polymer fine particles were obtained. The polymer fine particles were dispersed in water to measure the volume average particle size by the same method as in Example 1. As a result, the volume average particle size was 10 μm, and the CV value was 26%.

EXAMPLE 7

Polystyrene particles were obtained by the same operation as in Example 6, except that the raw material to be emulsified was changed to styrene in which 1% by mass of benzoyl peroxide was dissolved. The volume average particle size of the polymer fine particles measured by the same method as in Example 1 was 11 μm, and the CV value was 24%.

COMPARATIVE EXAMPLE 1

Using 300 parts of "Nisseki Naphtesol (Grade 200)" and 600 parts of a dispersant aqueous solution (1% by mass PVA 205, manufactured by Kuraray Co., Ltd.), emulsification/dispersion was carried out by use of a T.K. Homomixer (manufactured by Tokushu Kika Kogyo Co., Ltd.) until the average volume particle size of dispersion phase became 20 μm. The CV value at that time was 42%.

COMPARATIVE EXAMPLE 2

Emulsification/dispersion was carried out until the dispersion phase droplet diameter became 10 μm by the same operation as in Comparative Example 1, except that the raw materials to be emulsified were changed to 300 parts of "Nisseki Hisol SAS (Grade 296)" in which 5% by mass of crystal violet lactone was dissolved and 600 parts of a dispersant aqueous solution (5 wt % Micron 8020, manufactured by Nissho Kogyo Co., Ltd.). Using the resulting emulsion liquid, capsulation was carried out by the same treatment as in Example 5 followed by evaluation. The volume average particle size of the resulting capsules was 10 μm, and the CV value was 42%. As a result of evaluation, coloring in commercially available CF paper was observed. The cause of coloring is thought possibly to be attributable to breakage of large particle size capsules present in the capsule slurry.

COMPARATIVE EXAMPLE 3

Emulsification/dispersion was carried out by the same operation as in Comparative Example 1, except that the raw materials to be emulsified were changed to 300 parts of methyl methacrylate (MMA) in which 1% by mass of benzoyl peroxide was dissolved and 600 parts of a dispersant aqueous solution (1% by mass PVA 205, manufactured by Kuraray Co., Ltd.). Thereafter, MMA in the emulsion liquid was polymerized by the method of Example 6 to thereby obtain MMA polymer particles. The average volume particle size of the MMA polymer particles was 9 μm, and the CV value was 58%.

INDUSTRIAL APPLICABILITY

Since droplets in an emulsion liquid obtained by the method and apparatus of the present invention have a controlled particle size distribution, particularly a uniform particle size distribution narrower than previously produced, the emulsion can be suitably used as raw materials and products in the fields of cosmetics, food, paint, paper manufacture, film, recording material and the like. In application to cosmetics thereof, excellent compatibility with the skin and excellent product stability can be ensured.

Since microcapsules and polymer particles obtained from the emulsion liquid also have controlled particle size distributions, particularly uniform particle size distributions narrower than in the past, the microcapsules are suitably used as information recording materials using pressure sensitivity, heat sensitivity, and photosensitivity, including toner for copying machine and printer, as display material such as electronic paper, and further as medicine, pesticide, insecticide, fragrance, thermal storage medium and the like. The polymer fine particles obtained from the emulsion liquid are suitably used as antiblocking agent for plastic film, as optical material for providing light diffusion/reflection preventing functions or for spacer use, as paint and ink for providing functions such as frosting, coloring and tactile sensation to building materials or automotive interiors, as cosmetic material for providing slipping property to foundation or the like, as resin additive for providing various performances such as improvement in heat resistance or solvent resistance or low shrinkage property, and further as diagnostic testing agent or particulate formulation in medical field. The microcapsules and polymer fine particles are used, in addition, for various purposes such as pigment, dyestuff, a conductive member, thermosensitive recording paper, resin reinforcement, grease additive, artificial stone, chromatography and the like.

The invention claimed is:

1. An emulsification method, comprising the step of continuously and successively passing two or more liquids which are substantially immiscible with each other through two or more mesh members disposed at an interval of 5 to 200 mm within a flow passage in the presence of an emulsifier, said step producing a narrow particle size distribution (CV value) of 35% or less, wherein CV value (%) =standard deviation of droplet diameter distribution/volume average particle size ×100.

2. The method according to claim 1, wherein the number of the two or more mesh members to be disposed is 5 to 50.

3. The method according to claim 1, wherein the mesh members have a fineness of mesh corresponding to mesh of Mesh No. 35 to 4000 specified in ASTM Standard.

4. The method according to claim 1, wherein the mesh members have a multilayer structure.

5. An emulsification apparatus, comprising liquid feed pumps for feeding two or more types of liquids which are substantially immiscible with each other, and a cylindrical flow passage in which the two or more types of liquids fed by the liquid feed pumps are introduced through one end thereof, and passed toward the other end thereof, the cylindrical flow passage including two or more mesh members disposed therein at intervals of 5 to 200 mm, so that emulsification is performed by successively passing the liquids through the two or more mesh members and emulsion particles produced by the emulsion apparatus have a narrow particle size distribution (CV value) of 35% or less, wherein CV value (%) =standard deviation of droplet diameter distribution/volume average particle size ×100.

6. The emulsification apparatus according to claim 5, wherein the number of the mesh members to be disposed is 5 to 50.

7. The emulsification apparatus according to claim 5, wherein the mesh members have a fineness of mesh corresponding to mesh of Mesh No. 35 to 4000 specified in ASTM Standard.

8. The emulsification apparatus according to claim 5, wherein the mesh members have a multilayer structure.

9. The emulsification apparatus according to claim 5, wherein the mesh members are composed of wire gauze.

10. The emulsification apparatus according to claim 5, wherein the liquid feed pumps are two or more pumps for independently feeding the two or more types of liquids, respectively.

11. The method according to claim 1, wherein:

the number of the two or more mesh members to be disposed is 5 to 50;

the mesh members have a fineness of mesh corresponding to mesh of Mesh No. 35 to 4000 specified in ASTM Standard; and the mesh members have a multilayer structure.

12. The method of claim 1, wherein said interval allows the particle size to stabilize without coagulation.

* * * * *